US012584611B2

(12) United States Patent
Yu

(10) Patent No.: US 12,584,611 B2
(45) Date of Patent: Mar. 24, 2026

(54) COLLAPSIBLE SUPPLEMENTAL ILLUMINATION DEVICE FOR SIGHTING DEVICE AND CONTROL METHOD THEREOF

(71) Applicant: Shenzhen Yixin Information Technology Co., Ltd., Shenzhen (CN)

(72) Inventor: Wei Yu, Shenzhen (CN)

(73) Assignee: Shenzhen Yixin Information Technology Co., Ltd., Shenzhen (CN)

( * ) Notice: Subject to any disclaimer, the term of this patent is extended or adjusted under 35 U.S.C. 154(b) by 155 days.

(21) Appl. No.: 18/605,718

(22) Filed: Mar. 14, 2024

(65) Prior Publication Data

US 2024/0219005 A1 Jul. 4, 2024

(51) Int. Cl.

| | |
|---|---|
| ***F21V 15/04*** | (2006.01) |
| ***F21V 21/26*** | (2006.01) |
| ***F21V 23/04*** | (2006.01) |
| ***F41G 1/35*** | (2006.01) |
| ***H05B 47/105*** | (2020.01) |

(52) U.S. Cl.

CPC .............. *F21V 15/04* (2013.01); *F21V 21/26* (2013.01); *F21V 23/0442* (2013.01); *F41G 1/35* (2013.01); *H05B 47/105* (2020.01)

(58) Field of Classification Search

CPC ... F41G 1/35; F41G 1/34; F41G 1/345; F41G 1/36; F21V 15/04; F21V 21/26; F21V 23/0442; F21V 19/02; F21L 4/045; H05C 47/105; H05C 47/115; H05C 47/125

See application file for complete search history.

(56) References Cited

U.S. PATENT DOCUMENTS

| | | | | |
|---|---|---|---|---|
| 3,833,799 A | | 9/1974 | Audet | |
| 3,867,764 A | * | 2/1975 | Dunmire | F41G 11/003 362/800 |
| 4,348,716 A | * | 9/1982 | Storm | F41G 1/35 362/202 |
| 4,707,772 A | * | 11/1987 | Jimenez | F41G 1/35 362/419 |
| 5,471,374 A | * | 11/1995 | Palmer | F41G 1/36 362/427 |
| 2003/0000372 A1 | * | 1/2003 | Meyers | F41G 1/35 89/41.06 |
| 2008/0209789 A1 | * | 9/2008 | Oz | F41G 11/003 42/90 |
| 2012/0180368 A1 | * | 7/2012 | Haley | F41G 1/18 42/132 |

FOREIGN PATENT DOCUMENTS

| | | | | |
|---|---|---|---|---|
| CN | 104712917 B | | 3/2018 | |
| CN | 114545614 A | * | 5/2022 | G02B 23/00 |

* cited by examiner

*Primary Examiner* — Erin Kryukova

(57) ABSTRACT

A collapsible supplemental illumination device for a sighting device, including an illumination unit, a damping motion unit, a locking mechanism, and a position detection device. The damping motion unit is fixedly mounted on a main body of the sighting device. The damping motion unit is connected to the locking mechanism. The position detection device is provided on the locking mechanism. The illumination unit is rotatably connected to the damping motion unit through the locking mechanism. A control method of the collapsible supplemental illumination device is further provided.

7 Claims, 6 Drawing Sheets

COLLAPSIBLE SUPPLEMENTAL ILLUMINATION DEVICE FOR SIGHTING DEVICE AND CONTROL METHOD THEREOF

TECHNICAL FIELD

This application relates to sighting devices, and more particularly to a collapsible supplemental illumination device for a sighting device and a control method thereof.

BACKGROUND

Sighting devices require an additional illumination device to improve imaging quality and enhance target identification in poor illumination situations. The existing supplemental illumination devices are mostly disposed by external hanging, and are fixed to the sighting device or the gun via a fixing device. Moreover, it is required to carry the sighting device, the gun, and the supplemental illumination device separately.

In general, the supplemental illumination device is small, and are prone to be lost when separately carried. When not in use, the attachment of the supplemental illumination device to the gun or the sighting device will significantly increase the overall volume, resulting in inconvenient use. To solve the technical problem, a collapsible supplemental illumination device for sighting devices and a control method thereof are provided.

SUMMARY

In view of the deficiencies in the prior art, this application provides a collapsible supplemental illumination device for a sighting device.

Technical solutions of this application are described as follows.

This application provides a collapsible supplemental illumination device for a sighting device, comprising:

an illumination unit;

a damping motion unit;

a locking mechanism; and a position detection device;

wherein the collapsible supplemental illumination device is fixedly arranged at a main body of the sighting device; the damping motion unit is fixedly mounted on the main body of the sighting device; the damping motion unit is connected to the locking mechanism; the position detection device is provided on the locking mechanism; and the illumination unit is rotatably connected to the damping motion unit through the locking mechanism.

In an embodiment, the damping motion unit comprises a base, an elastic adjustment member, a locking nut, and a rotating shaft; and the base is detachably mounted on the main body of the sighting device; a first through hole is provided in the base; the rotating shaft is configured to run through the first through hole, and is slidable along a lengthwise direction of the first through hole; the locking mechanism is rotatably sleeved on the rotating shaft; the locking mechanism is provided at a first side of the base, and the locking nut is provided at a second side of the base; and the elastic adjustment member is provided between the locking nut and the base.

In an embodiment, the damping motion unit further comprises a first friction plate, a second friction plate, and a third friction plate; and the locking mechanism comprises a rotating structure; and an end of the rotating shaft away from the locking nut is provided with a flange protruding outwardly; the second friction plate is fixedly provided on a first side of the rotating structure, and sleevedly provided on the rotating shaft; a side of the second friction plate away from the locking mechanism abuts against a side of the flange close to the base; the first friction plate and the third friction plate are sleevedly provided on an outer circumference of the rotating shaft; the first friction plate is fixedly mounted on a side of the base away from the elastic adjustment member; the third friction plate is fixedly mounted on a second side of the rotating structure of the locking mechanism; a side of the third friction plate abuts against the first friction plate; the rotating structure is provided between the flange and the base; and the rotating structure has a tubular shape, and is rotatably sleeved on the rotating shaft.

In an embodiment, the locking mechanism further comprises a first fixed portion and a first movable portion; and the first fixed portion is fixedly connected to the rotating shaft; the first movable portion is rotatably sleeved on the rotating shaft; an end of the rotating shaft away from the base is fixedly mounted on the first fixed portion; the rotating structure is provided on the first movable portion; and a limiting mechanism is provided between the first movable portion and the first fixed portion for controlling a rotation of the first movable portion.

In an embodiment, the limiting mechanism comprises a reset spring and a release button; and the first movable portion is provided with a second through hole; the release button is configured to pass through the second through hole; a first end of the reset spring is connected to the release button, and a second end of the reset spring is connected to the first fixed portion; an outer side of the release button is provided with a plurality of first protrusions in an arrayed arrangement; the first fixed portion is provided with a plurality of first grooves; the plurality of first protrusions are in one-to-one correspondence with the plurality of first grooves; the first movable portion is provided with a plurality of second grooves in an arrayed arrangement; and the plurality of first protrusions are slidably provided in the plurality of first grooves along a length direction of the first fixed portion, respectively, and capable of respectively sliding into the plurality of second grooves.

In an embodiment, the position detection device comprises a detector and a second fixed portion; and the detector is fixedly mounted on the first movable portion; the second fixed portion is fixedly mounted on the first fixed portion; and the second fixed portion is provided with a second protrusion for blocking a detecting light path of the detector when the supplemental illumination device is at a working position.

In an embodiment, the position detection device further comprises a second movable portion; and the detector is fixedly mounted on the first movable portion through the second movable portion.

This application further provides a control method of the collapsible supplemental illumination device, the collapsible supplemental illumination device further comprising a control device, the control device comprising an image sensor and a main control board;

the image sensor, the position detection device, and the illumination unit are electrically connected to the main control board; and the control method comprising:

acquiring and transmitting, by the image sensor, image data to the main control board; and obtaining, by the main control board, illumination information of a current scene based on the image data; determining, by the main control board, whether to turn on the illumination unit, and an illumination intensity of the illumination unit according to the illumination information and the position data of the collapsible supplemental illumination device sent by the position detection device.

Compared with the prior art, this application has the following beneficial effects.

The supplemental illumination device in this application is fixed on the main body of the sighting device, such that it is not prone to be lost, and is convenient to carry. Moreover, the locking mechanism is rotatably connected to the damping motion unit, such that the supplemental illumination device of this application can be adjusted in position and pose after use. When not in use, the supplemental illumination device can be also be adjusted in position and pose, making it convenient to carry and use. The supplemental illumination device is turned on only when necessary, thereby dramatically reducing the risk of exposure.

In the figures: 1—main body; 2—supplemental illumination device; 21—illumination unit; 22—damping motion unit; 23—locking mechanism; 24—position detection device; 221—base; 222—elastic adjustment member; 223—locking nut; 224—rotating shaft; 225—first friction plate; 226—second friction plate; 227—third friction plate; 228—first through hole; 2241—flange; 231—first movable portion; 232—reset spring; 233—release button; 234—first fixed portion; 2311—second groove; 2312—rotating structure; 2331—first protrusion; 2341—first groove; 241—detector; 242—second movable portion; 243—second fixed portion; and 2431—second protrusion.

DETAILED DESCRIPTION OF EMBODIMENTS

The technical solutions in the embodiments of the present disclosure will be described clearly and completely below in conjunction with the accompanying drawings. Described below are merely some embodiments of the disclosure, which are not intended to limit the disclosure. For those skilled in the art, other embodiments obtained based on these embodiments without paying creative efforts should fall within the scope of the disclosure defined by the appended claims.

Embodiment 1

Figure 1:
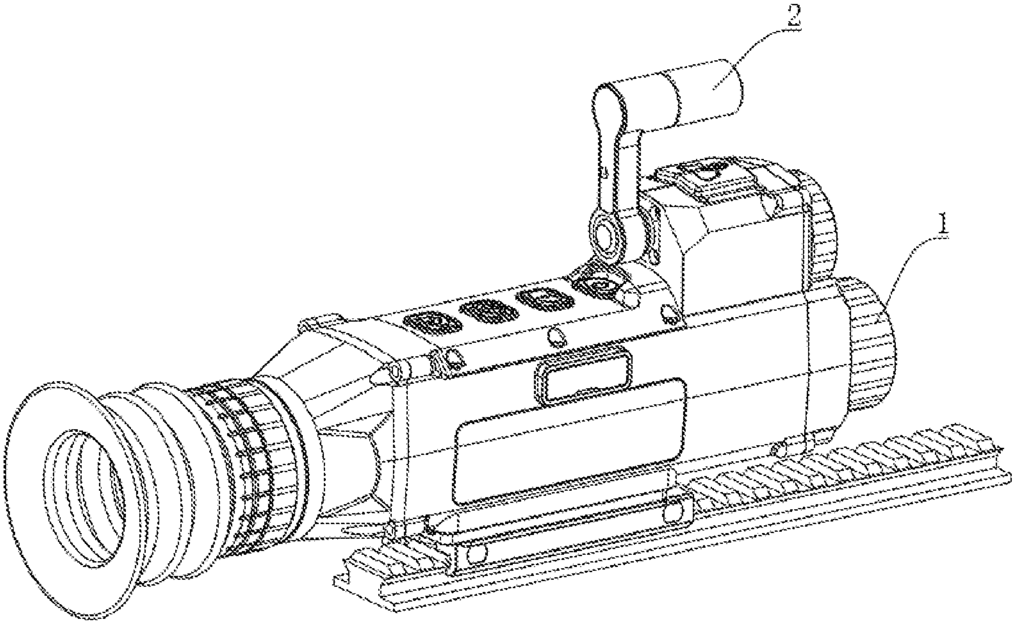
FIG. 1 is a schematic diagram of a collapsible supplemental illumination device for a sighting device according to one embodiment of the present disclosure.
Figure 2:
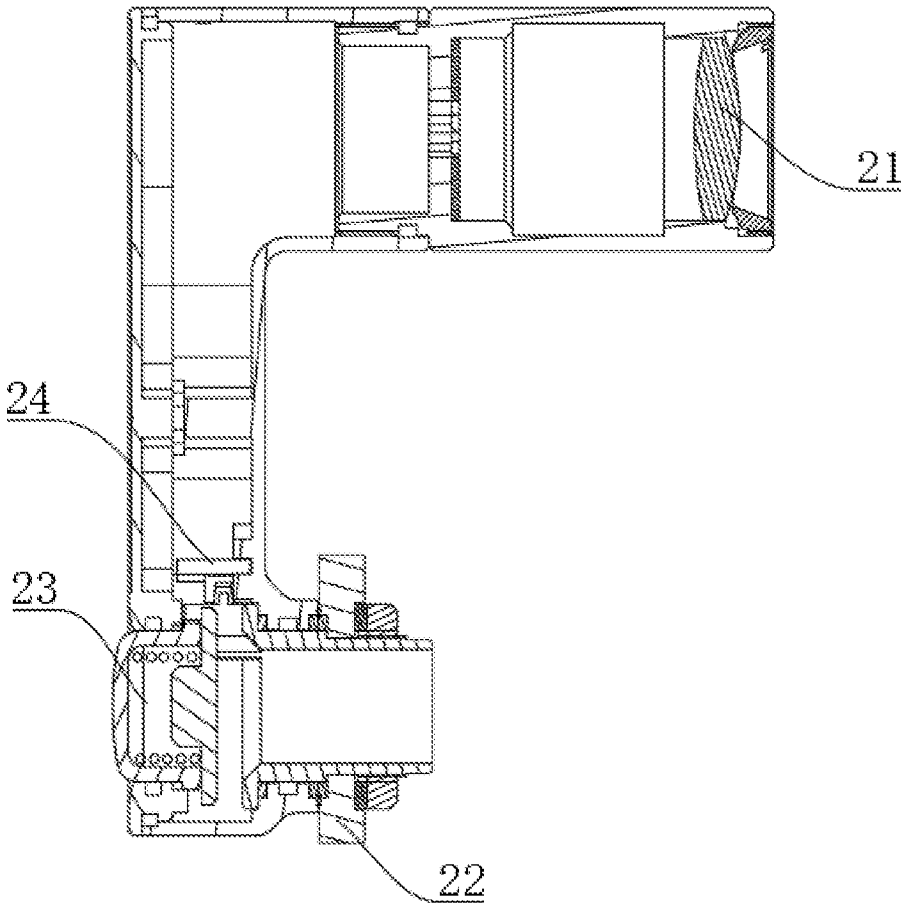
FIG. 2 is a sectional view of the collapsible supplemental illumination device according to one embodiment of the present disclosure.
Figure 3:
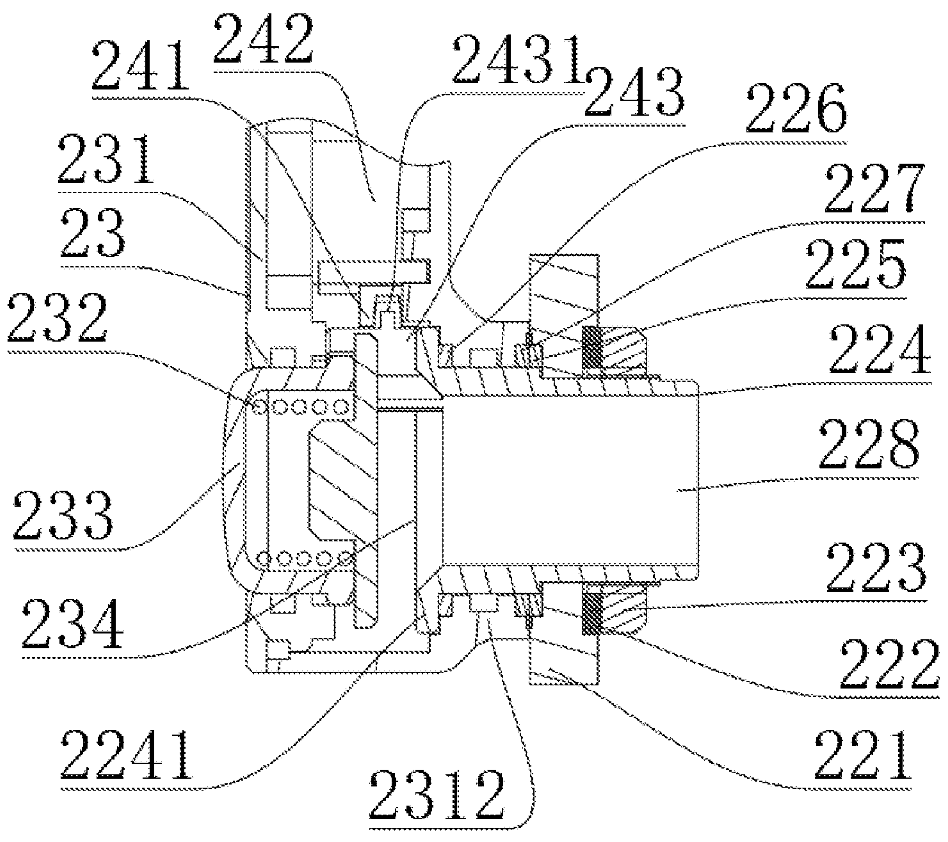
FIG. 3 is sectional view of a bottom structure of the collapsible supplemental illumination device according to one embodiment of the present disclosure.

Referring to FIGS. 1 to 3, a collapsible supplemental illumination device for a sighting device is provided, which includes a main body 1 of the sighting device and a supplemental illumination device 2. The supplemental illumination device 2 is fixedly mounted on the main body 1. The supplemental illumination device 2 includes an illumination unit 21, a damping motion unit 22, a locking mechanism 23, and a position detection device 24. The damping motion unit 22 is fixedly mounted on the main body 1. The damping motion unit 22 is connected to the locking mechanism 23. The position detection device 24 is provided on the locking mechanism 23. The illumination unit 21 is rotatably connected to the damping motion unit 22 through the locking mechanism 23.

The supplemental illumination device 2 in this disclosure is fixed on the main body 1 of the sighting device, such that it is not prone to be lost, and is convenient to carry. Moreover, the locking mechanism 23 is rotatably connected to the damping motion unit 22, such that the supplemental illumination device 2 of this disclosure can be adjusted in position and pose after use. When not in use, the supplemental illumination device 2 can be also be adjusted in position and pose, making it convenient to carry and use. The supplemental illumination device 2 is turned on only when necessary, thereby dramatically reducing the risk of exposure.

It is to be noted that the supplemental illumination device 2 may be provided in an L-shaped structure. Specifically, the illumination unit 21 is horizontally disposed, and the locking mechanism 23 is vertically disposed. One end of the locking mechanism 23 away from the illumination unit 21 is mounted on the main body 1 of the sighting device by means of the damping motion unit 22. Such an arrangement facilitates the illumination direction of the illumination unit 21 to be consistent with the shooting direction. In this embodiment, the damping motion unit 22 is parallel to the illumination unit 21, and the damping motion unit 22 is mounted on the rear end of the main body 1.

Referring to an embodiment shown in FIGS. 2 and 3, the damping motion unit 22 includes a base 221, an elastic adjustment member 222, a locking nut 223 and a rotating shaft 224. The base 221 is detachably mounted on the main body 1 of the sighting device. A first through hole 228 is provided in the base 221. The rotating shaft 224 is configured to run through the first through hole 228 on the base 221 and is slidable along a lengthwise direction of the first through hole 228. The locking mechanism 23 is rotatably sleeved on the rotating shaft 224. The locking mechanism 23 is provided at a first side of the base 221, and the locking nut 223 is provided at a second side of the base 221. The internal thread inside the locking nut 223 is matched with the external thread outside the rotating shaft 224. The elastic adjustment member 222 is provided between the locking nut 223 and the base 221. The two ends of the elastic adjustment member 222 are respectively touched on the locking nut 223 and the base 221. By providing the elastic adjustment member 222, the variation of the locking force can be reduced.

In an embodiment, the elastic adjustment member 222 may be an adjusting spring.

Referring to FIGS. 2 and 3, in this embodiment, in order to further realize the damping setting, the damping motion unit 22 further includes a first friction plate 225, a second friction plate 226, and a third friction plate 227. The locking mechanism 23 includes a rotating structure 2312. An end of the rotating shaft 224 away from the locking nut 223 is provided with a flange 2241 protruding outwardly. The second friction plate 226 is fixedly provided on a first side of the rotating structure 2312, and is sleevedly provided on the rotating shaft 224. The side of the second friction plate 226 away from the locking mechanism 23 abuts against a side of the flange 2241 close to the base 221. The first friction plate 225 and the third friction plate 227 are sleeved on the outer circumference of the rotating shaft 224. The first friction plate 225 is fixedly mounted on the side of the base 221 away from the elastic adjustment member 222. The third friction plate 227 is fixedly mounted on a second side of the rotating structure 2312 of the locking mechanism 23. One side of the third friction plate 227 abuts against the first friction plate 225. The rotating structure 2312 is provided between the flange 2241 and the base 221. The rotating structure 2312 has a tubular shape, and is rotatably sleeved on the rotating shaft 224. Specifically, the second friction plate 226 and the third friction plate 227 will rotate together with the locking mechanism 23 when the locking mechanism 23 rotates, the friction force between the second friction plate 226 and the flange 2241 of the rotating shaft 224 and the friction force between the first friction plate 225 and the third friction plate 227 can stabilize the locking mechanism 23 thereby avoiding instability.

It is noted that the first friction plate 225, the second friction plate 226 and the third friction plate 227 may all have an annular structure.

In an embodiment, the base 221 can be fixedly mounted on the main body 1 by bolts on all sides.

Referring to an embodiment shown in FIGS. 2 and 3, the locking mechanism 23 includes a first fixed portion 234 and a first movable portion 231. The first fixed portion 234 is fixedly connected to the rotating shaft 224, and the first movable portion 231 is rotatably sleeved on the rotating shaft 224. One end of the rotating shaft 224 away from the base 221 is fixedly mounted on the first fixed portion 234. The rotating structure 2312 is provided on the first movable portion 231. In this way, the second friction plate 226 and the third friction plate 227 will rotate together with the locking mechanism 23 when the first movable portion 231 rotates, the friction force between the second friction plate 226 and the flange 2241 of the rotating shaft 224 and the friction force between the first friction plate 225 and the third friction plate 227 can stabilize the first movable portion 231 to avoid the instability. A limiting mechanism for controlling the rotation of the first movable portion 231 is also provided between the first movable portion 231 and the first fixed portion 234.

Figure 4:
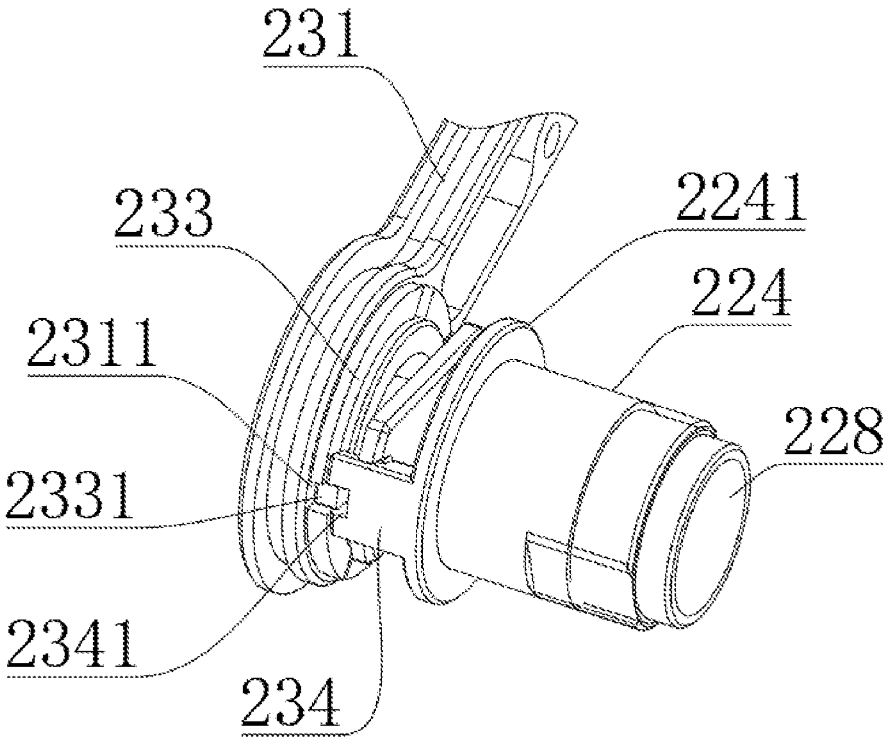
FIG. 4 shows a locking mechanism in the collapsible supplemental illumination device according to one embodiment of the present disclosure in a locking state.
Figure 5:
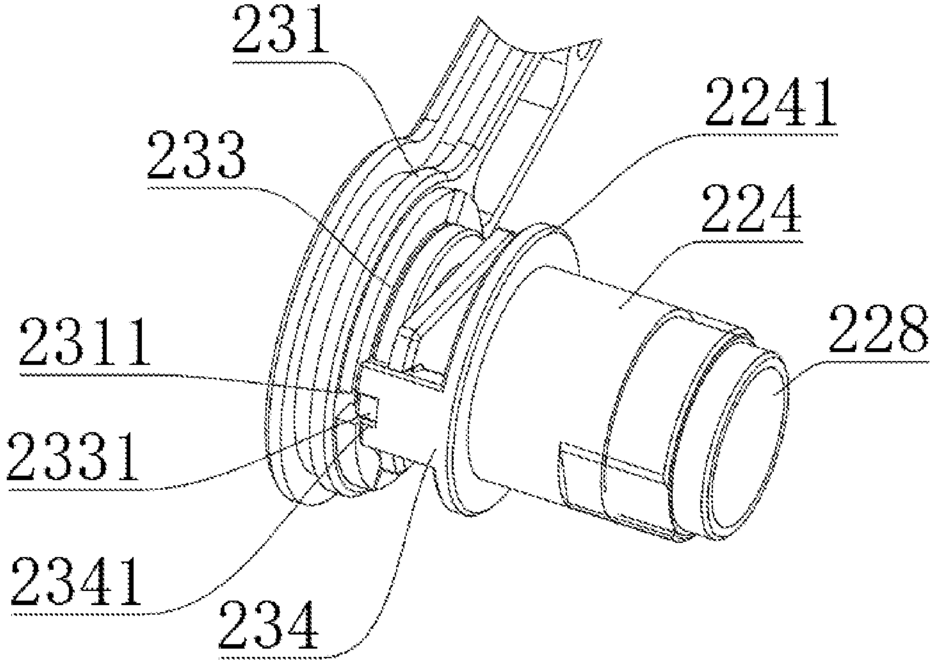
FIG. 5 shows the locking mechanism in the collapsible supplemental illumination device according to one embodiment of the present disclosure in a rotation state.

Referring to FIGS. 4 and 5, in this embodiment, the limiting mechanism includes a reset spring 232 and a release button 233. The first movable portion 231 is provided with a second through hole. The release button 233 is configured to pass through the second through hole. The two ends of the reset spring 232 are connected to the release button 233 and the first fixed portion 234 respectively. The outer side of the release button 233 is provided with a plurality of first protrusions 2331 in an arrayed arrangement. The first fixed portion 234 is provided with a plurality of first grooves 2341. The plurality of first protrusions 2331 are in one-to-one correspondence with the plurality of first grooves 2341. The first movable portion 231 is provided with a plurality of second grooves 2311 in an arrayed arrangement. The plurality of first protrusions 2331 are slidably provided in the plurality of first grooves 2341 along the length direction of the first fixed portion 234, respectively. The plurality of first protrusions 2331 are also capable of respectively sliding into the plurality of second grooves 2311. Specifically, in the unfolded position or the folded position, in the non-release state, the reset spring 232 pops up the release button 233, the first protrusion 2331 is embedded in the second groove 2311 of the first movable portion 231 and the first groove 2341 of the first fixed portion 234, and the supplemental illumination device is locked in the fixed position (as shown in FIG. 4). In the release state, the release button 233 is pressed down, and the first protrusion 2331 is fully inserted into the first groove 2341 of the first fixed portion 234 and is disengaged from the second groove 2311, and the first movable portion 231 is free to rotate (as shown in FIG. 5). The rotational control of the position of the entire supplemental illumination device 2 is thus achieved.

Specifically, the reset spring 232 may be provided inside the release button 233. The reset spring 232 may be a coil spring.

Referring to FIGS. 2 and 3, in this embodiment, in order to facilitate the detection of the specific position of the supplemental illumination device 2, the position detection device 24 is therefore provided. The position detection device 24 includes a detector 241 and a second fixed portion 243. The detector 241 is fixedly mounted on the first movable portion 231. The second fixed portion 243 is fixedly mounted on the first fixed portion 234. The second fixed portion 243 is provided with a second protrusion 2431 for blocking the detecting light path of the detector 241 when the supplemental illumination device 2 is at the operating position. By providing the detector 241 on the first movable portion 231, the position of the supplemental illumination device 2 has been determined by determining whether the light path will be blocked when the position of the first movable portion 231 changes.

The position detection device 24 further includes a second movable portion 242. The detector 241 is fixedly mounted on the first movable portion 231 by the second movable portion 242.

It is to be noted that the position detection device 24 may also use mechanical switches or realize by Hall detection.

This disclosure can overcome the inconvenience of carrying and using the external supplemental illumination device. In use, only when necessary, the illumination device is switched on, substantially reducing the risk of exposing oneself. The supplemental illumination device 2 is fixed to the main body 1 of the sighting device, and there is no risk of loss.

Embodiment 2

Figure 6:
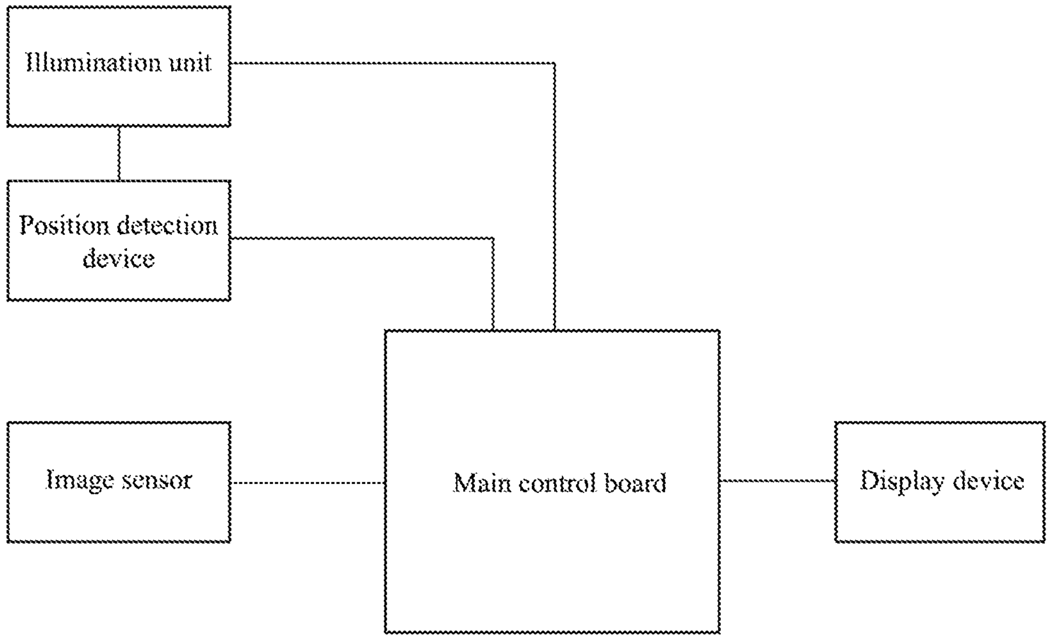
FIG. 6 is a schematic diagram of a control device of the collapsible supplemental illumination device according to one embodiment of the present disclosure.

Referring to FIG. 6, this disclosure further provides a control method of the collapsible supplemental illumination device. The control method is applied to the collapsible supplemental illumination device. The collapsible supplemental illumination device further includes a control device which includes an image sensor and a main control board. The image sensor, the position detection device 24, and the illumination unit 21 are electrically connected to the main control board. The control method includes the following steps.

S1. The image sensor acquires image data and transmits the image data to the main control board.

S2. The main control board obtains illumination information of a current scene based on the image data, and determines whether to turn on the illumination unit 21 and control the illumination intensity of the illumination unit 21 based on the illumination information and position data of the collapsible supplemental illumination device sent by the position detection device 24.

It is to be noted that the illumination unit 21 includes a frame body and the illumination member disposed on the frame body. The illumination unit is electrically connected to the main control board, so as to realize the control of switching on and brightness of the illumination unit.

It is to be noted that the control device may further include a display device.

It is further noted that the frame body is fixedly connected to the first movable portion 231.

Specifically, when requiring supplemental illumination, the user rotates the supplemental illumination device 2 to the illumination position (FIG. 4). At this time, the main control board determines that the supplemental illumination device 2 is located in the correct position by means of the position detection device 24. When detecting external illumination insufficient, the illumination unit 21 can be switched on to provide supplemental illumination for targets. When the external illumination does not require supplemental illumination, the illumination unit 21 is switched off to reduce the risk of self-exposure.

When the user determines that there is no need to use the supplemental illumination device 2, a cover can be placed in a folded position, which can effectively reduce the space occupied by the supplemental illumination device and make it easier to carry.

As used herein, unless otherwise expressly specified and defined, terms, such as "mount", "connect", and "fix", should be understood in a broad sense, for example, it may be fixed connection, detachable connection, or integral connection; it may be mechanical direction or electrical connection; it may be direct connection or indirect connection through an intermediate medium; and it may be an internal communication between two elements. For those skilled in the art, the specific meanings of the above terms can be understood according to specific situations.

As used herein, unless otherwise expressly specified and defined, "a first feature "above" or "below" a second feature" may be a direct contact between the first and second features, or an indirect contact between the first and second features through an intermediate medium. Furthermore, "the first feature "above" the second feature" may indicate that the first feature is directly above or diagonally above the second feature, or simply indicate that the first feature is higher than the second feature in a horizontal direction. The first feature being "below" the second feature may indicate that the first feature is directly below or diagonally below the second feature, or may simply mean that the first feature is lower than the second feature in the horizontal direction.

Although the disclosure has been described in detail above with reference to the embodiments, it can be understood that the embodiments are merely illustrative, and not intended to limit the scope of the disclosure. Any modifications, variations, and replacements made by those skilled in the art without departing from the spirit of the disclosure should fall within the scope of the disclosure defined by the appended claims.

What is claimed is:

1. A collapsible supplemental illumination device for a sighting device, comprising:

an illumination unit;

a damping motion unit;

a locking mechanism; and a position detection device;

wherein the collapsible supplemental illumination device is fixedly arranged at a main body of the sighting device; the damping motion unit is fixedly mounted on the main body of the sighting device; the damping motion unit is connected to the locking mechanism; the position detection device is provided on the locking mechanism; and the illumination unit is rotatably connected to the damping motion unit through the locking mechanism.

2. The collapsible supplemental illumination device of claim 1, wherein the damping motion unit comprises a base, an elastic adjustment member, a locking nut, and a rotating shaft; and the base is detachably mounted on the main body of the sighting device; a first through hole is provided in the base; the rotating shaft is configured to run through the first through hole, and is slidable along a lengthwise direction of the first through hole; the locking mechanism is rotatably sleeved on the rotating shaft; the locking mechanism is provided at a first side of the base, and the locking nut is provided at a second side of the base; and the elastic adjustment member is provided between the locking nut and the base.

3. The collapsible supplemental illumination device of claim 2, wherein the damping motion unit further comprises a first friction plate, a second friction plate, and a third friction plate; the locking mechanism comprises a rotating structure; and an end of the rotating shaft away from the locking nut is provided with a flange protruding outwardly; the second friction plate is fixedly provided on a first side of the rotating structure, and sleevedly provided on the rotating shaft; a side of the second friction plate away from the locking mechanism abuts against a side of the flange close to the base; the first friction plate and the third friction plate are sleevedly provided on an outer circumference of the rotating shaft; the first friction plate is fixedly mounted on a side of the base away from the elastic adjustment member; the third friction plate is fixedly mounted on a second side of the rotating structure of the locking mechanism; a side of the third friction plate abuts against the first friction plate; the rotating structure is provided between the flange and the base; and the rotating structure has a tubular shape, and is rotatably sleeved on the rotating shaft.

4. The collapsible supplemental illumination device of claim 3, wherein the locking mechanism further comprises a first fixed portion and a first movable portion; and the first fixed portion is fixedly connected to the rotating shaft; the first movable portion is rotatably sleeved on the rotating shaft; an end of the rotating shaft away from the base is fixedly mounted on the first fixed portion; the rotating structure is provided on the first movable portion; and a limiting mechanism is provided between the first movable portion and the first fixed portion for controlling a rotation of the first movable portion.

5. The collapsible supplemental illumination device of claim 4, wherein the limiting mechanism comprises a reset spring and a release button; and the first movable portion is provided with a second through hole; the release button is configured to pass through the second through hole; a first end of the reset spring is connected to the release button, and a second end of the reset spring is connected to the first fixed portion; an outer side of the release button is provided with a plurality of first protrusions in an arrayed arrangement; the first fixed portion is provided with a plurality of first grooves; the plurality of first protrusions are in one-to-one correspondence with the plurality of first grooves; the first movable portion is provided with a plurality of second grooves in an arrayed arrangement; and the plurality of first protrusions are slidably provided in the plurality of first grooves along a length direction of the first fixed portion, respectively, and capable of respectively sliding into the plurality of second grooves.

6. The collapsible supplemental illumination device of claim 5, wherein the position detection device comprises a detector and a second fixed portion; and the detector is fixedly mounted on the first movable portion; the second fixed portion is fixedly mounted on the first fixed portion; and the second fixed portion is provided with a second protrusion for blocking a detecting light path of the detector when the supplemental illumination device is at a working position.

7. The collapsible supplemental illumination device of claim 6, wherein the position detection device further comprises a second movable portion; and the detector is fixedly mounted on the first movable portion through the second movable portion.

* * * * *